(12) United States Patent
Tabei et al.

(10) Patent No.: US 7,716,520 B2
(45) Date of Patent: May 11, 2010

(54) MULTI-CPU COMPUTER AND METHOD OF RESTARTING SYSTEM

(75) Inventors: Ryo Tabei, Kawasaki (JP); Hiroshi Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 11/879,390

(22) Filed: Jul. 17, 2007

(65) Prior Publication Data

US 2008/0010506 A1 Jan. 10, 2008

Related U.S. Application Data

(63) Continuation of application No. PCT/JP2005/001770, filed on Feb. 7, 2005.

(51) Int. Cl.
*G06F 11/00* (2006.01)

(52) U.S. Cl. .......................................... 714/10; 714/11

(58) Field of Classification Search ........................ None
See application file for complete search history.

(56) References Cited

U.S. PATENT DOCUMENTS

| | | | |
|---|---|---|---|
| 6,199,179 B1 * | 3/2001 | Kauffman et al. | 714/26 |
| 6,516,429 B1 * | 2/2003 | Bossen et al. | 714/47 |
| 6,622,260 B1 * | 9/2003 | Marisetty et al. | 714/10 |
| 6,725,317 B1 * | 4/2004 | Bouchier et al. | 710/312 |
| 7,082,610 B2 * | 7/2006 | Lal | 719/318 |
| 7,257,734 B2 * | 8/2007 | Vaidyanathan | 714/13 |
| 2003/0051190 A1 * | 3/2003 | Marisetty et al. | 714/11 |
| 2003/0074598 A1 * | 4/2003 | Bossen et al. | 714/6 |

FOREIGN PATENT DOCUMENTS

| | | |
|---|---|---|
| JP | 02-071336 | 3/1990 |
| JP | 03-048940 | 3/1991 |
| JP | 04-340631 | 11/1992 |
| JP | 06-243101 | 9/1994 |
| JP | 06-243104 | 9/1994 |
| JP | 06-332864 | 12/1994 |
| JP | 11-338838 | 12/1999 |
| JP | 2000-311155 | 11/2000 |

* cited by examiner

*Primary Examiner*—Michael C Maskulinski
(74) *Attorney, Agent, or Firm*—Greer, Burns & Crain, Ltd.

(57) ABSTRACT

A multi-CPU computer which is capable of positively performing error handling, and restarting a system even when a fatal error has occurred in a CPU. When a hardware error has occurred in a first CPU, error information is notified to a second CPU by a first error notification circuit of the first CPU. Then, the error information notified from the first CPU is obtained by a second error notification circuit of the second CPU, and error handling based on the error information is requested of an operating system. The second CPU executes a process for storing fault information including the error information in a storage device and a process for restarting the system, according to the operating system.

4 Claims, 8 Drawing Sheets

MULTI-CPU COMPUTER AND METHOD OF RESTARTING SYSTEM

This application is a continuing application, filed under 35 U.S.C. §111(a), of International Application PCT/JP2005/001770, filed Feb. 7, 2005.

BACKGROUND OF THE INVENTION

1. Field of the Invention

This invention relates to a multi-CPU computer having a plurality of CPUs installed therein for operating on a common operating system, and a method of restarting a system for the multi-CPU computer, and more particularly to a multi-CPU computer for performing an emergency shut-down of the system when a hardware error has occurred, and a method of restarting the system for the multi-CPU computer.

2. Description of the Related Art

Recently, UNIX® servers, and IA servers (server machines having a microprocessor available from Intel Corporation installed therein) have been introduced to main systems. Many of the UNIX servers and the IA servers are configured as multi-processor servers for enhanced performance. It should be noted that as to servers used for the main systems, much importance is placed not only on the enhancement of performance but also on the enhancement of reliability. Particularly when a fatal hardware error has occurred, it is necessary to prevent the system from running out of control and data from being destroyed. To this end, when a fatal hardware error has occurred, the system is subjected to an emergency shut-down.

In the case of the main system, however, it is not permitted to stop the system for a long time period. Therefore, in the multi-processor server, even when the system is subjected to an emergency shut-down due to a hardware error, it is a critical requirement to restart the system quickly and automatically by isolating only a portion of the system where the error has occurred. Hardware errors which occur in the server include continuous occurrence of a multi-bit error in a CPU (Central Processing Unit) cache, for example.

In the prior art, when a fatal CPU error, such as the multi-bit error in the CPU cache, has occurred, the following error handling is conventionally carried out: First, a CPU in which the error has occurred sets error information in a register. Then, the CPU generates a trap to notify the operating system of occurrence of the error.

The operating system executes trapping at the CPU in which the error has occurred. In the trapping, the operating system refers to the register of the hardware to obtain the error information.

After that, the CPU in which the error has occurred carries out panic handling. The panic handling is to subject the system to an emergency shut-down and restart the same so as to prevent the system from running out of control and data from being destroyed. In the panic handling, the CPU displays and records the error information, performs synchronization of a file system to obtain a memory dump, and then restarts the system.

Figure 8:
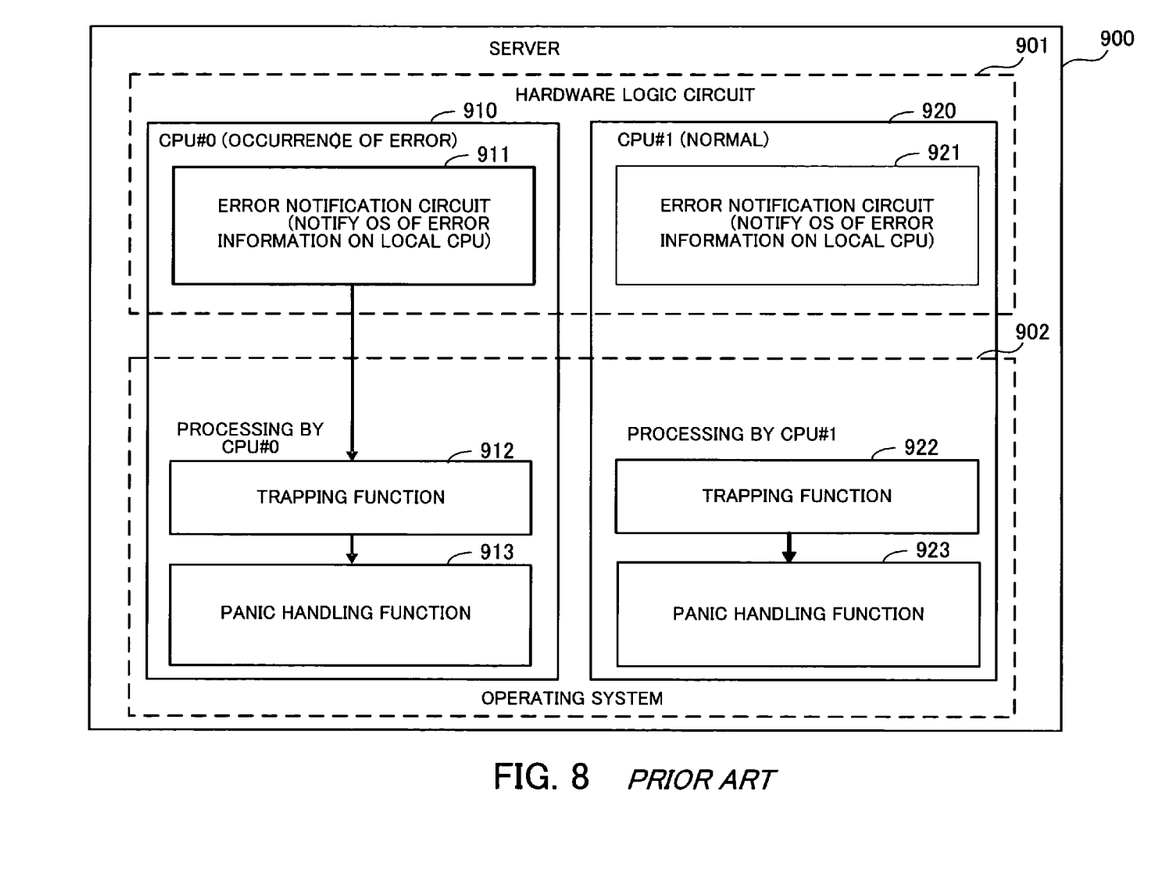
FIG. 8 is a diagram showing a conventional method of restarting a system when an error has occurred.

FIG. 8 is a diagram showing a conventional method of restarting the system when an error has occurred. A server 900 has a CPU 910 and a CPU, 920. The CPU number of the CPU 910 is "CPU #0", and the CPU number of the CPU 920 is "CPU #1". Processing executed by the CPU 910 and the CPU 920 includes processing executed in a hardware logic circuit 901 and processing executed according to an operating system 902.

The CPU 910 and the CPU 920 have error notification circuits 911 and 921 as processing functions executed by the hardware logic circuit 901. Further, the error notification circuits 911 and 921 notify the operating system of information indicative of a hardware error which has occurred in a CPU. It should be noted that notification of error information to the operating system is intended to mean processing for passing the error information to a process for performing error handling of the operating system. More specifically, each of the CPU 910 and the CPU 920 sets error information in a predetermined register when a hardware error has occurred, and generates a trap. The error information includes an error type, a CPU number, an address of data where the error has occurred. A process based on the operating system refers to the register storing the error information, whereby the error information is notified.

Processing functions executed according to the operating system 902 include trapping functions 912 and 922, and panic handling functions 913 and 923. The trapping functions 912 and 922 are each provided for obtaining a error type, a CPU number, and an address with reference to the register storing error information. The panic handling functions 913 and 923 are each provided for displaying and recording the error information, synchronizing the file system, obtaining a memory dump, and restarting the system.

The example illustrated in FIG. 8 shows a case in which an error has occurred in the CPU 910. In this case, the error notification circuit 911 of the CPU 910 notifies the operating system 902 of error information. Then, the trapping function 912 executed by the CPU 910 according to the operating system 902 performs trapping, whereby the operating system 902 obtains the information including the error type, the CPU number, and the address. Subsequently, the panic handling function 913 displays and records the error information, synchronizes a file system, obtains a memory dump, and then restarts the system.

As described above, when the error handling (trapping and panic handling) is executed by the operating system, it is also possible to notify a high-order computer of fault information obtained by the operating system of a low-order computer (see e.g. Japanese Unexamined Patent Publication No. 04-340631).

Further, a technique is also known in which a diagnosis processor having obtained fault information from a faulty processor notifies an high-order processor of occurrence of a fault, and the high-order processor initializes and restarts the faulty processor, to thereby restore the faulty processor to an operative state (see e.g. Japanese Unexamined Patent Publication No. 02-71336).

Further, there has been proposed a technique for obtaining fault information when a fault has occurred in the multi-CPU computer, in which a plurality of processors executes the obtaining of fault information in parallel with each other to thereby shorten a time period required for obtaining the fault information. In this technique, a processor in which is detected occurrence of the fault instructs other processors to obtain the fault information, and the instructed processors obtain the fault information (see e.g. Japanese Unexamined Patent Publication No. 11-338838).

However, in the procedure shown in FIG. 8, the trapping and the panic handling are carried out by the CPU in which the error has occurred, and the system is restarted. Therefore, when a multi-bit error has continuously occurred in the CPU cache, the CPU sometimes cannot operate normally. Even if the CPU incapable of operating normally is about to execute the trapping and the panic handling of the system, the accurate processing cannot always be performed. Therefore, there is a fear that when a hardware error has occurred, the system in operation is hung up or the restart thereof fails. This can cause a serious problem that the operation of the system is stopped for a long time period, for example.

When the system cannot carry out error handling accurately, the following problems, for example, are expected to occur.

When error information is not displayed, it is impossible to identify a CPU to be replaced for prevention of recurrence of the error. In this case, even when the system is manually restarted after occurrence of the problem, there is a possibility that the same problem is caused again by the same error.

When the synchronization of the file system cannot be executed, data existing on a file cache (memory) cannot be written on a disk. This can cause destruction of files and data.

When a memory dump fails to be obtained, it is impossible to analyze details of information based on the memory dump, e.g. as to when the error occurred, which process was being executed then, and what error occurred. For example, there is a case where the same CPU error occurs again during the panic handling in the error handling of a CPU error, which prevents accurate error information from being displayed. In this case, if the memory dump as well failed to be obtained, there is no means for identifying the primary factor.

When the restart of the system fails, there can be caused a serious problem that the operation of the system is stopped for a long time period. If the time period of stoppage of the system for key business operations becomes longer, it can also become an object of public concern.

It should be noted that in the technique disclosed in Japanese Unexamined Patent Publication No. 04-340631, the operating system of the low-order computer notifies the fault information. Therefore, there is no guarantee that the operating system operates normally on the faulty low-order computer. This can cause a state where the fault information cannot be notified to the high-order computer.

Further, in the technique disclosed in Japanese Unexamined Patent Publication No. 02-71336, the diagnosis processor obtains fault information from another faulty processor, and the high-order processor initializes and restarts the faulty processor. More specifically, it is assumed that the processors operate individually, and can be restarted independently. In many multi-CPU computers, however, a plurality of CPUs operate on a common operating system. In such multi-CPU computers, data shared by the CPUs exists, and to restart one of the CPUs, processing for ensuring consistency of data is required. Therefore, it is difficult to apply the technique disclosed in Japanese Unexamined Patent Publication No. 02-71336 to a multi-CPU computer in which a plurality of CPUs operate on a common operating system.

Furthermore, in the technique disclosed in Japanese Unexamined Patent Publication No. 11-338838, processors other than the processor in which a fault has occurred obtains fault information, and hence it is possible to obtain fault information by the normal processors. However, the system is restarted by the faulty processor. As a result, even when the process for restating the system is executed by the processor which does not operate normally, there is a possibility that the system cannot be started properly. If the system fails to be restarted, the time period of stoppage of the system becomes longer, which results in the degraded operating efficiency of the system.

SUMMARY OF THE INVENTION

The present invention has been made in view of the above-described problems, and an object thereof is to provide a multi-CPU computer which is capable of positively performing error handling and restarting a system even when a fatal error has occurred in a CPU, and a method of restarting the system.

To attain the above object, in a first aspect of the present invention, there is provided a multi-CPU computer having a plurality of CPUs installed therein for operating on a common operating system. This multi-CPU computer is characterized by comprising a nonvolatile storage device, a first CPU that incorporates a first error notification circuit for notifying another CPU of error information when a hardware error has occurred in the first CPU, and a second CPU that incorporates a second error notification circuit for obtaining the error information notified by the first CPU and notifying the operating system of the error information, the second CPU executing a process for storing fault information including the error information in the storage device, and a process for restarting the system, according to the operating system, when the error information is notified to the operating system by the second error notification circuit.

Further, to attain the above object, in a second aspect of the present invention, there is provided a system-restarting method for a multi-CPU computer that has a plurality of CPUs installed therein for operating on a common operating system. This method is characterized in that when a hardware error has occurred in a first CPU, a first error notification circuit incorporated in the first CPU notifies a second CPU of error information; a second error notification circuit incorporated in the second CPU obtains the error notification notified from the first CPU, and notifies the operating system of the error information; and when the error notification is notified to the operating system by the second error notification circuit, the second CPU executes a process for storing fault information including the error information in a nonvolatile storage device, and a process for restarting the system, according to the operating system.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The invention will now be described in detail with reference to drawings showing preferred embodiments thereof.

Figure 1:
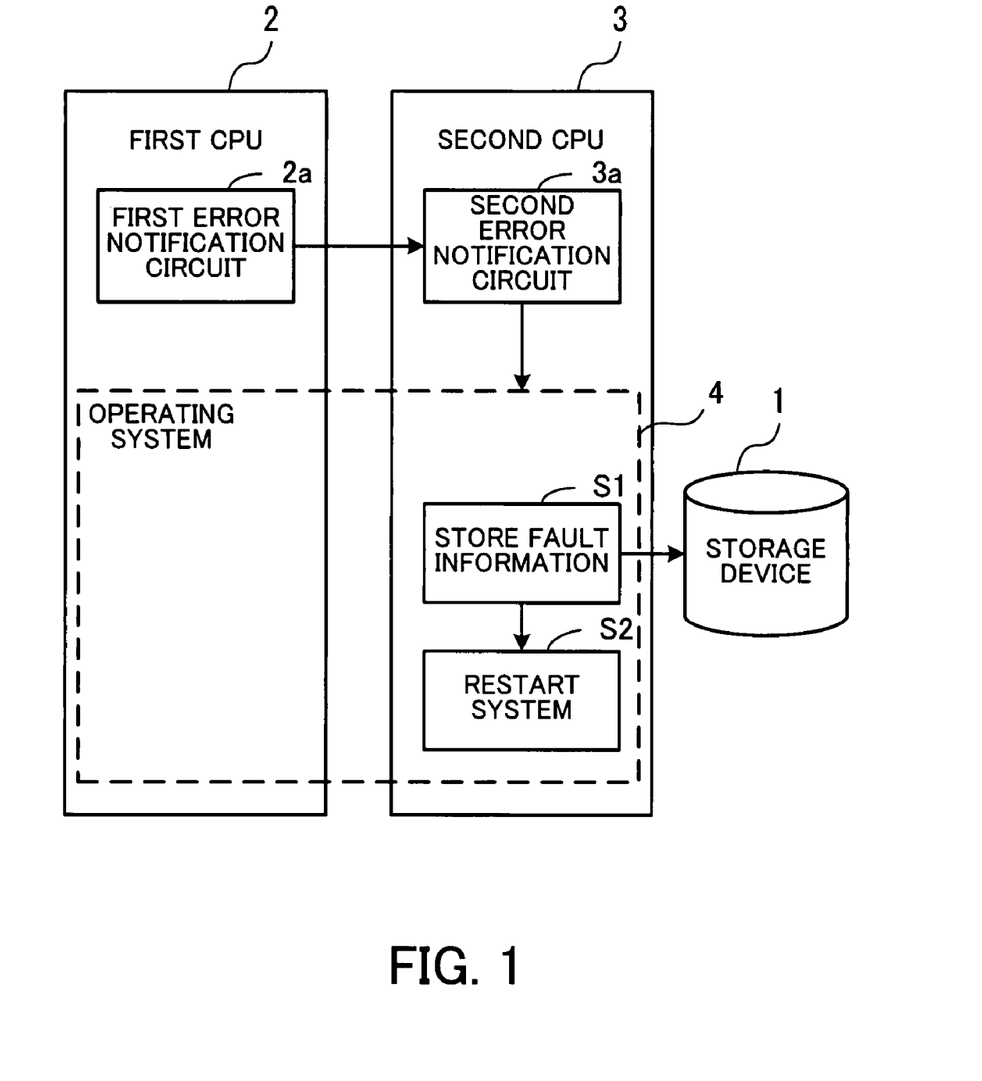
FIG. 1 is a schematic diagram showing the concept of an embodiment of the invention.

FIG. 1 is a schematic diagram showing the concept of an embodiment of the invention. In FIG. 1, there is shown the outline of the functions of a multi-CPU computer according to the present embodiment. The multi-CPU computer comprises a storage device 1, a first CPU 2, and a second CPU 3. The first CPU2 and the second CPU3 are operated by a common operating system 4.

The storage device 1 is nonvolatile, and is capable of holding data even during interruption of power supply. A magnetic storage device, such as a hard disk drive, can be employed as the storage device 1.

The first CPU 2 has a first error notification circuit 2a incorporated therein for notifying another CPU of error information when there occurs a hardware error. The hardware error includes a multi-bit error in a cache memory, for example. Examples of the error information include the kind of an error, the CPU number of a CPU in which the error has occurred, the address of data where the error has occurred.

The second CPU 3 has a second error notification circuit 3a incorporated therein for obtaining error information notified by the first CPU 2 to notify the operating system 4 of the error information. When error information is delivered from the second error notification circuit 3a to the operating system 4, the second CPU 3 executes a process (step S1) for storing fault information including the error information in the storage device 1, and a process (step S2) for restarting the system, according to the operating system 4. Not only the error information but also memory dump information can be included in the fault information.

According to the above-described multi-CPU computer, when a hardware error has occurred in the first CPU 2, the second CPU 3 is notified of error information on the hardware error by the first error notification circuit 2a of the first CPU 2. Then, the second error notification circuit 3a of the second CPU 3 obtains the error information notified by the first CPU 2, and notifies the error information to the operating system 4. The second CPU 3 carries out the process (step S1) for storing fault information including the error information in the storage device 1, and the process (step S2) for restarting the system, according to the operating system 4. Thus, the restart of the whole multi-CPU computer is performed.

As described above, if error information is configured to be notified to the operating system by a normal CPU, it is possible to positively store fault information including the error information to restart the system. For example, when there has occurred a multi-bit error in a CPU cache, the storage of error information and the restart of the system can be performed positively without being adversely affected by the multi-bit error in the CPU cache.

It should be noted that after notification of the error information, it is possible to stop the process executed by the first CPU 2, according to the operating system 4 for a predetermined time period. As described above, by temporarily stopping the process carried out by a CPU in which an error has occurred, it is possible to inhibit the faulty first CPU 2 from adversely affecting a process by the normal second CPU 3. As a result, the second CPU 3 can perform error handling positively.

Further, unless the system is restarted during the stoppage of the first CPU 2 for the predetermined time period, the first CPU 2 in which the error has occurred can resume the stopped process to execute error handling. More specifically, the CPU in which an error has occurred is configured to be capable of performing trapping and panic handling for confirmation after a predetermined time period. This is because a case is taken into account in which a CPU in which an error is detected is normal and there exists another CPU which is actually faulty, such as a case in which an error having occurred in a CPU is propagated to the CPU in which the error is detected.

By the way, the FIG. 1 example shows a configuration employed in a case where an error has occurred in the first CPU2, and error handling is carried out by the second CPU 3. In this case, the first error notification circuit 2a and the second error notification circuit 3a can be incorporated in the respective CPUs of the multi-CPU computer. With this configuration, in whichever of the CPUs may occur an error, the other CPU can execute error handling. Hereinafter, a detailed description will be given of the embodiment of the present invention by taking a multi-CPU computer configured such that each of all the CPUs is capable of error handling based on error information from other CPUs, as an example.

Figure 2:
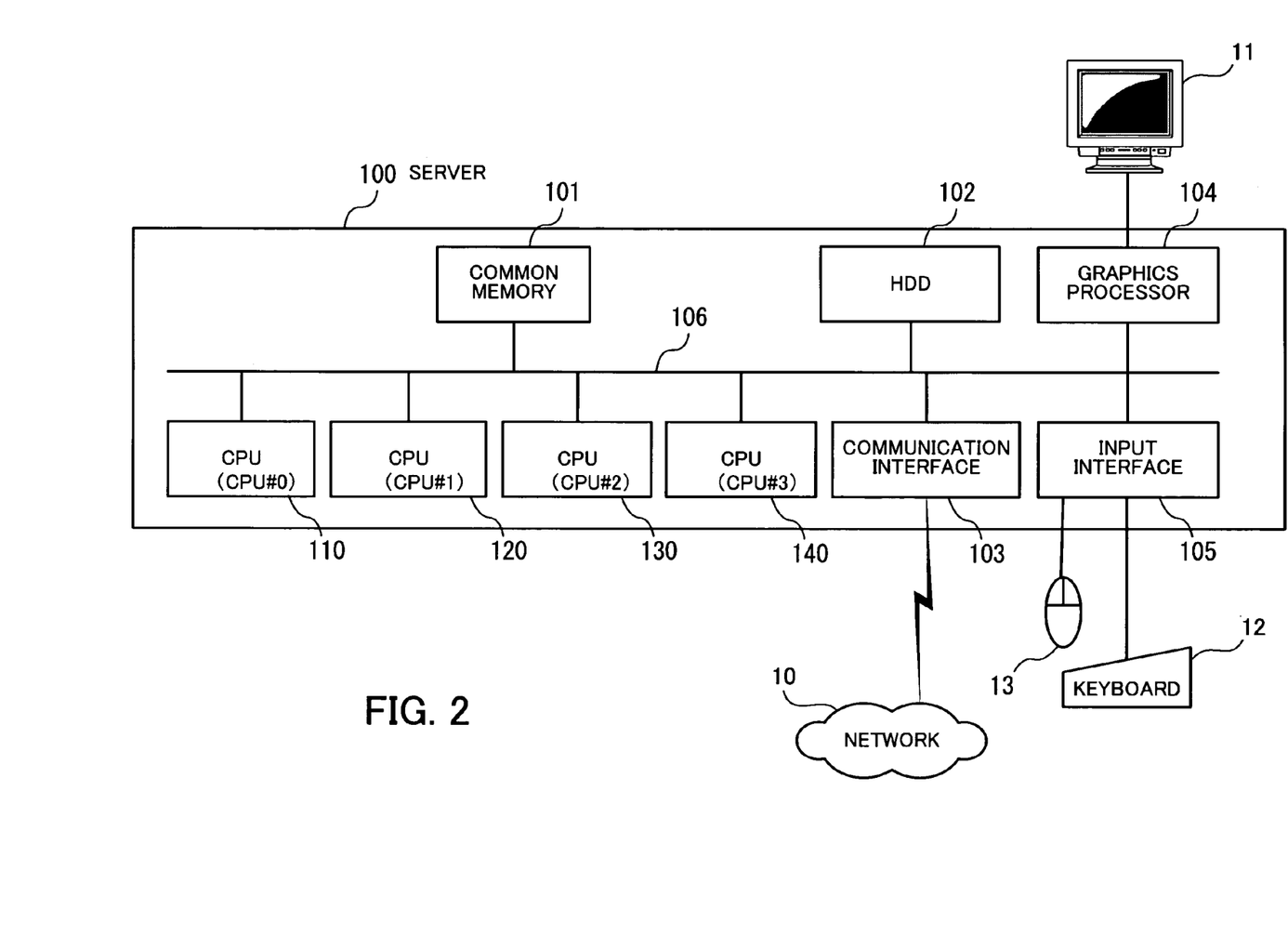
FIG. 2 is a diagram showing an example of the hardware configuration of a server used for executing the present invention.

FIG. 2 is a diagram showing an example of the hardware configuration of a server used in the present embodiment. The server 100 is a UNIX server, for example, and comprises a plurality of CPUs 110, 120, 130, and 140. Each of the CPUs 110, 120, 130, and 140 has a CPU number assigned thereto for uniquely identifying the CPU in the server 100. The CPU number of the CPU 110 is "CPU #0". The CPU number of the CPU 120 is "CPU #1". The CPU number of the CPU 130 is "CPU #2". The CPU number of the CPU 140 is "CPU #3".

A common memory 101, an HDD (Hard Disk Drive) 102, a communication interface 103, a graphics processor 104, and an input interface 105 are connected to the CPUs 110, 120, 130, and 140 via a system bus 106.

The common memory 101 temporarily stores at least part of programs of an operating system, and application programs executed by the CPUs 110, 120, 130, and 140. Further, the common memory 101 stores various data required for processes performed by the CPUs 110, 120, 130, and 140. The HDD 102 stores the operating system and the application programs.

The communication interface 103 is connected to a network 10. The communication interface 103 performs transmission and reception of data to and from other computers via the network 10.

The graphics processor 104 is connected to a monitor 11. The graphics processor 104 displays an image on the screen of the monitor 11 in response to commands from the CPUs 110, 120, 130, and 140. To the input interface 105 are connected a keyboard 12 and a mouse 13. The input interface 105 sends signals delivered from the keyboard 12 and the mouse 132 to the CPUs 110, 120, 130, and 140 via the system bus 106.

In the server 100 having the above hardware configuration, the operating system is carried out. As a result, various functions defined by the operating system are realized by the CPUs 110, 120, 130, and 140 in the server 100.

Figure 3:
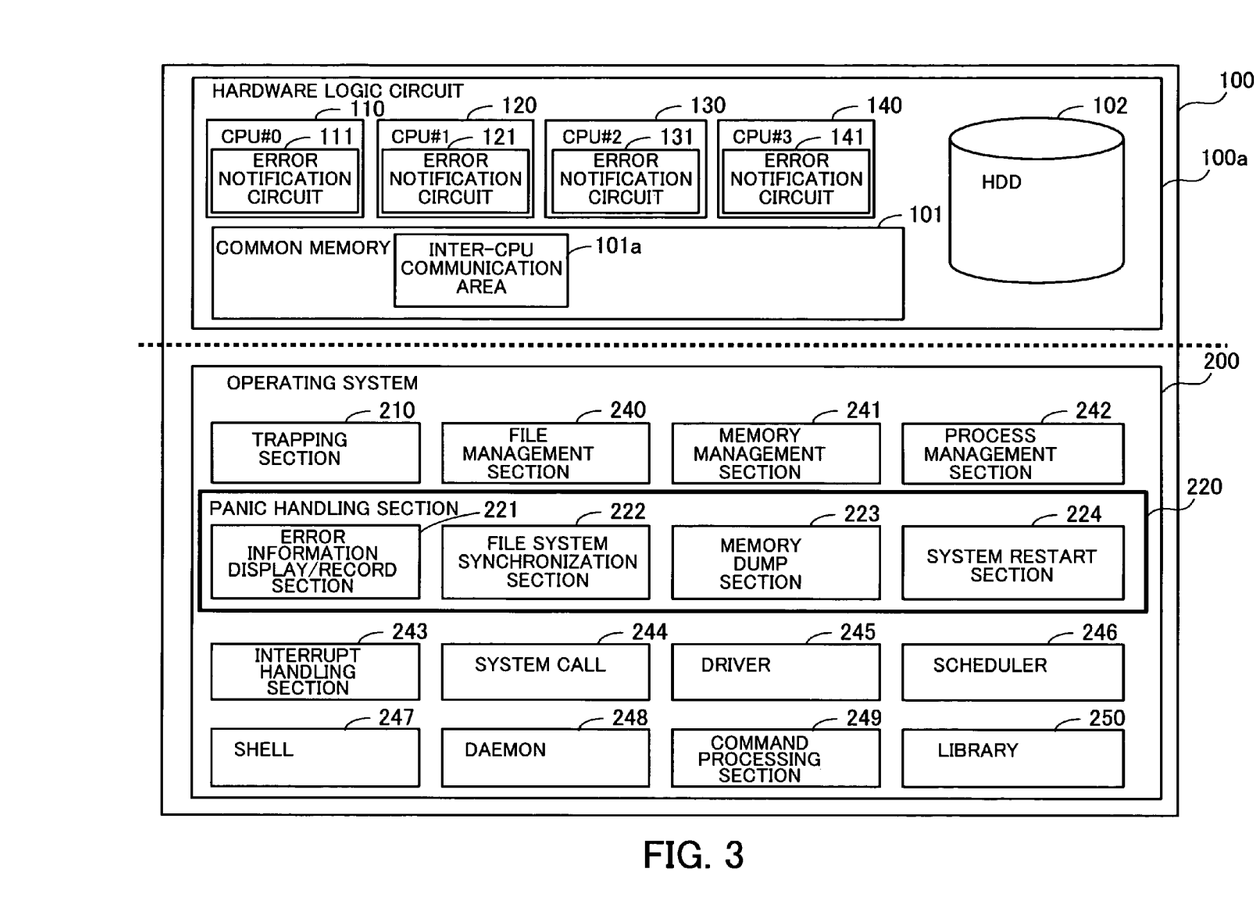
FIG. 3 is a block diagram showing the main functions of the server.

FIG. 3 is a block diagram showing the main functions of the server. The server 100 has functions implemented by a hardware logic circuit 100a, and functions implemented by software, such as an operating system 200, executed by the CPUs 110, 120, 130, and 140. In FIG. 3, the functions of the hardware and those of the software are shown on the upper side and the lower side of a dotted line, respectively.

The main functions of the hardware logic circuit 100a include the processing computation functions of the CPUs 110, 120, 130, and 140, the data temporary saving function of the common memory 101, and the data storing function of the HDD 102. The CPUs 110, 120, 130, and 140 are provided with error notification circuits, 111, 121, 131, and 141, respectively. Each of the error notification circuits, 111, 121, 131, and 141 notifies the operating system 200 of error information, and transfers and receives error information to and from the other CPUs.

The common memory 101 is provided with an inter-CPU communication area 101a. The inter-CPU communication area 101a is a storage area for storing information which the CPUs 110, 120, 130, and 140 should be transferred therebetween.

It should be noted that inter-CPU communication technology using the inter-CPU communication area 101a of the common memory 101 is disclosed in Japanese unexamined Patent Publication No. 06-243104, Japanese unexamined Patent Publication No. 06-243101, and Japanese Unexamined Patent Publication No. 06-332864.

The operating system 200 is provided with a trapping section 210 and a panic handling section 220 for recovery functions in case of occurrence of a hardware error. The trapping section 210 carries out trapping when a hardware error occurs. The panic handling section 220 performs panic handling.

The panic handling section 220 includes an error information display/record section 221, a file system synchronization section 222, a memory dump section 223, and a system restart section 224. The error information display/record section 221 displays error information, and records the error information on the HDD 102. The file system synchronization section 222 checks the consistency of file systems to repair inconsistent file systems. The memory dump section 223 dumps data in the common memory 101. The system restart section 224 restarts the system.

Further, the other functions of the operating system 200 include a file management section 240, a memory management section 241, a process management section 242, an interrupt handling section 243, a system call 244, a driver 245, a scheduler 246, a shell 247, a daemon 248, a command processing section 249, a library 250, and so forth.

The file management section 240 manages files in the HDD 102. The memory management section 241 manages data in the common memory 101. The process management section 242 manages processes executed by the respective CPUs. The interrupt handling section 243 manages interrupt handling routines for interrupting the CPUs. The system call 244 is a function of calling the operating system in response to a request from processes executed by the CPUs. The driver 245 is a function of controlling peripheral devices. The scheduler 246 is a function of managing the schedules of processes executed by the CPUs. The shell 247 is a function of transmitting instructions from the user to the OS. The daemon 248 is a function of being resident in the memory for providing various services. The command processing section 249 has a function of interpreting input commands and executing processes according to the commands. The library 250 is a collection of functions formed as parts for being utilized by other programs.

It should be noted that the CPUs 110, 120, 130, and 140 carry out programs for the operating system 200, whereby the functions of the operating system 200 are realized individually on the CPUs 110, 120, 130, and 140.

Figure 4:
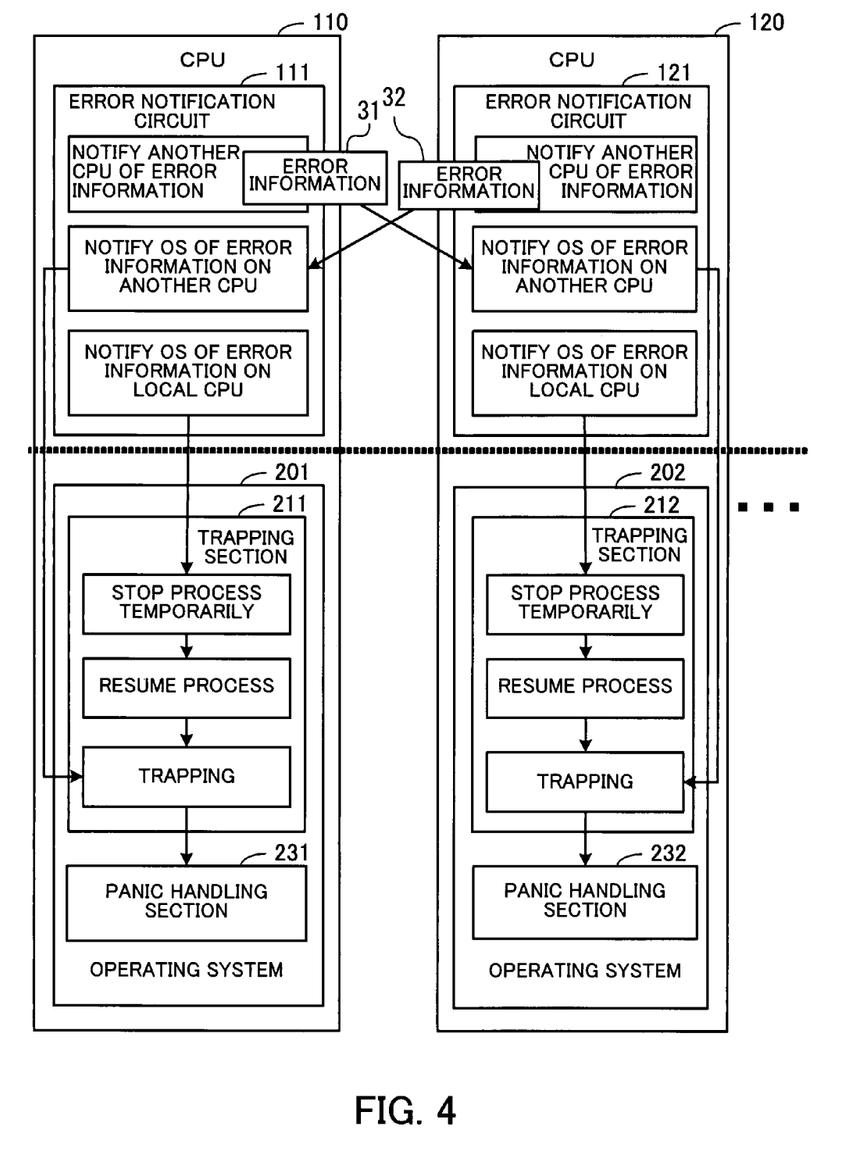
FIG. 4 is a diagram showing the relationship between error notification circuits of CPUs and error handling functions of an operating system.

FIG. 4 is a diagram showing the relationship between the error notification circuits of the CPUs and the error handling functions of operating systems. It should be noted that FIG. 4 shows the CPUs 110 and 120, and error notification processes of operating systems 201 and 202, executed by the CPUs 110 and 120.

The error notification circuit 111 of the CPU 110 has the function of notifying the other CPU 120 of error information 31 on an error occurring in the CPU 110, the function of notifying an operating system 201 carried out by the CPU 110 of error information 32 on an error occurring in the other CPU 120, and the function of notifying the operating system 201 carried out by the CPU 110 of the error information 31 of the error occurring in the CPU 110. Similarly, the error notification circuit 121 of the CPU 120 has the function of notifying the other CPU 110 of the error information 32 on an error occurring in the CPU 120, the function of notifying an operating system 202 carried out by the CPU 120 of the error information 31 on an error occurring in the other CPU 110, and the function of notifying the operating system 202 carried out by the CPU 120 of the error information 32 on the error occurring in the CPU 120.

Thus, the error information 31 on an error occurring in the other CPU 110 is notified not only to the operating system 202 carried out by the CPU 120 via the error notification circuit 121 of the CPU 120 but also to the operating system 201 carried out by the CPU 110. Further, the error information 32 on an error occurring in the CPU 120 is notified not only to the operating system 201 carried out by the CPU 110 via the error notification circuit 111 of the CPU 110 but also to the operating system 202 carried out by the CPU 120.

In the operating system 201 carried out by the CPU 110, a trapping section 211 receives the error information 31 on an error occurring in the other CPU 110. In this case, the trapping section 211 temporarily stops a process executed by the CPU 110. To stop the process by the CPU 110, the trapping section 211 can utilize a function of hardware for temporarily stopping the operation of the CPU 110, if available. Further, the trapping section 211 can also stop other processes by the CPU 110, by causing the CPU 110 to execute a simple loop process using software.

As described above, when an error has occurred in the CPU 110 itself, the process executed by the CPU 110 is temporarily stopped so as to hold information obtained when the error has occurred. More specifically, if the CPU 110 continues to perform normal operation after occurrence of the error, there is a possibility that information effective for identifying the cause of occurrence of the error in the memory is overwritten by other information. To eliminate this inconvenience, the process by the CPU 110 is temporarily stopped, thereby making it possible to obtain accurate information when the error has occurred. Further, by stopping the faulty CPU 110, it is possible to stably carry out error handling by the CPU 120.

When the process by the CPU 110 is stopped, the trapping section 211 causes the CPU 110 to resume its process after the lapse of a predetermined time period. This is to cause the CPU 110 to execute the error handling by itself, when the error handling by the other CPU 120 has failed. It should be noted that when the error handling is normally carried out by the other CPU 120, the restart of the system is performed in the last step of the error handling. As a result, the inner parameters of the CPU 110 are also initialized, whereby the error handling by the CPU 110 is canceled at this time point.

When the trapping section 211 receives the error information on the other CPU 120 from the error notification circuit 111 of the CPU 110, and when the trapping section 211 receives the error information on the CPU 110 and resumes the process by the CPU 110 after temporary stoppage thereof, the trapping section 211 carries out trapping. More specifically, the trapping section 211 refers to a predetermined register in the CPU 110 to obtain an error type, a CPU number, and an address. The trapping section 211 passes the error information to a panic handling section 231 after termination of the trapping.

The panic handling section 231 performs panic handling. In the panic handling, the error information display/record section 221 displays error information on the monitor, and stores the error information in the HDD 102. Further, the file system synchronization section 222 synchronizes between a file system and the contents of an actual file (data of the structure of the file system held in the HDD 102 is updated in synchronism with update of the actual file). Furthermore, the memory dump section 223 dumps data in the common memory 101 (stores data in the common memory 101 into the HDD 102). Finally, the system restart section 224 restarts the whole systems of the server 100.

The operating system 202 carried out by the CPU 120 has the same processing functions as those of the operating system 201 carried out by the CPU 110.

Figure 5:
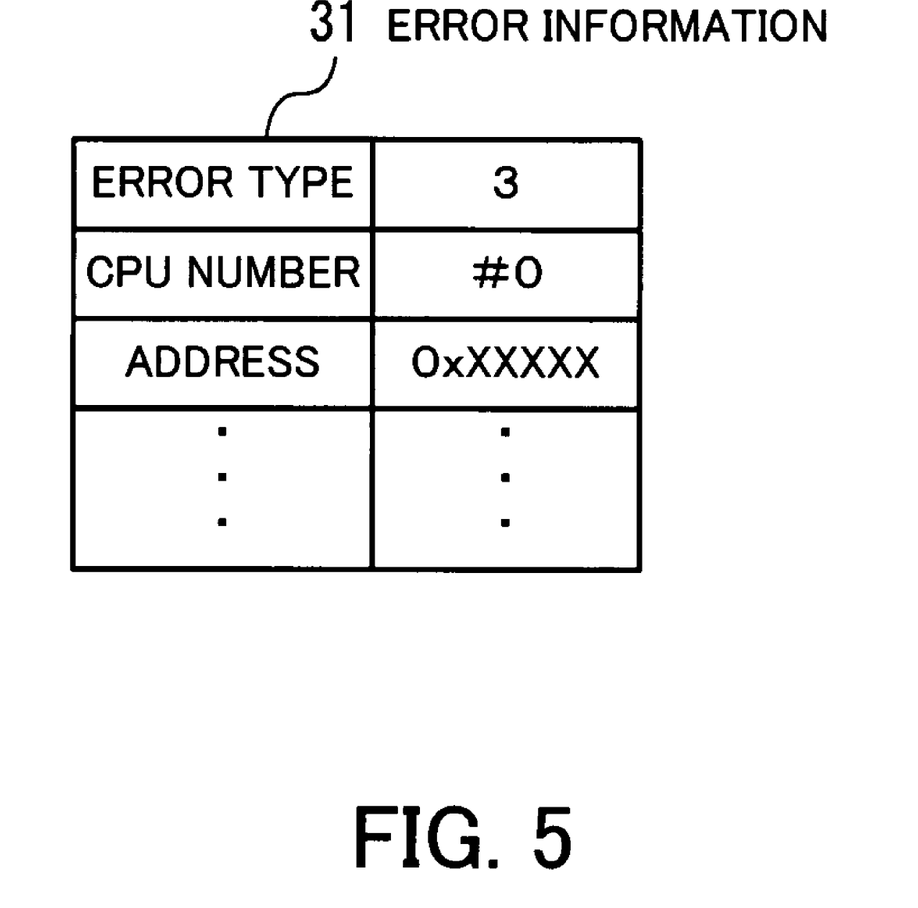
FIG. 5 is a diagram showing an example of the data structure of error information.

FIG. 5 is a diagram showing an example of the data structure of error information. The error information 31 includes an error type, a CPU number, and an address. The error type is represented by an identification code which represents the type of an error which has occurred. The CPU number is an identification number of a CPU in which the error has occurred. The address represents the address of data where the error has occurred.

Next, a processing procedure employed when a hardware error has occurred in the CPU 110 will be described hereinafter.

Figure 6:
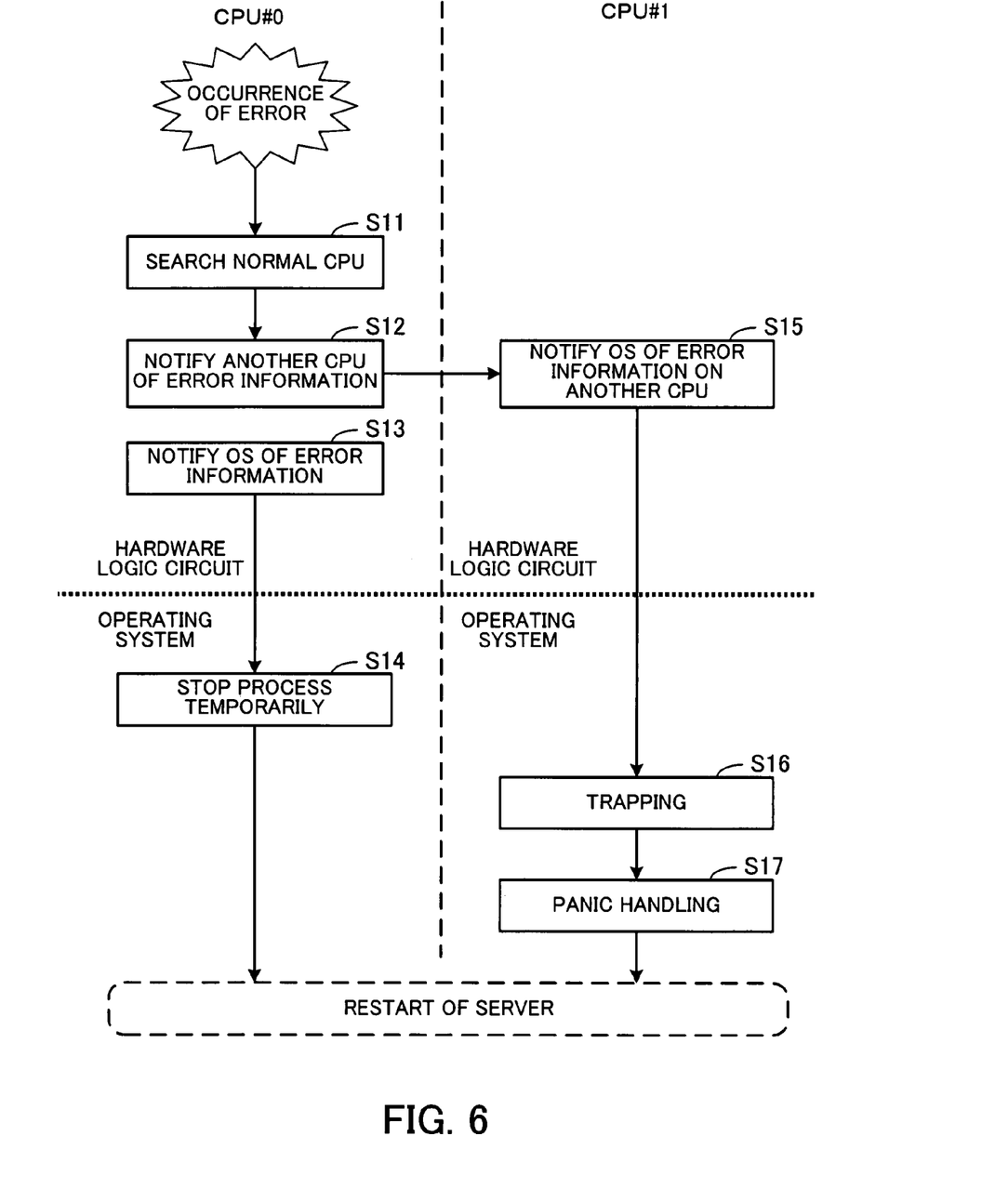
FIG. 6 is a sequence diagram showing a case in which error handling is normally carried out by another CPU.

FIG. 6 is a sequence diagram showing a case in which error handling is normally carried out by another CPU. When a hardware error has occurred in the CPU 110 whose CPU number is "CPU #0", a normal CPU other than the CPU 110 is searched for by the error notification circuit 111 of the CPU 110 (step S11). For example, when a fatal error, such as a multi-bit error in the cache, has occurred in the CPU 110, the error notification circuit 111 searches a normal CPU. More specifically, the error notification circuit 111 selects a CPU, which has the smallest CPU number of CPUs in which no error is detected, as the normal CPU. It should be noted that whether or not a CPU is one in which no error is detected can be determined by obtaining information on the status (which sets information whether or not each CPU is normally operating) of each CPU stored in the common memory 101 and referring to the status.

Then, the error notification circuit 111 of the CPU 110 notifies the CPU 120 selected in the step S11 of error information (step S12). More specifically, the error notification circuit 111 writes error information in the inter-CPU communication area 101a of the common memory 101, and the error notification circuit 121 of the CPU 120 reads the error information. This notifies occurrence of the error in the CPU 110 to the CPU 120.

The error notification circuit 111 of the CPU 110 notifies the operating system 201 carried out by the CPU 110 of the error information on the error which has occurred in the CPU 110 (step S13). More specifically, the error notification circuit 111 stores the error information, such as the error type, the CPU number of the CPU in which the error has occurred, and the address, in a predetermined register. After that, the error notification circuit 111 generates a trap (starts the trapping section 211 of the operating system 201). Then, the trapping section 211 of the operating system 201 refers to the contents of the register in which the error information is written. This notifies the error information to the operating system 201.

In the operating system 201 carried out by the CPU 110, the trapping section 211 temporarily stops the normal processes (all the processes except the minimum process for resuming the stopped process) of the CPU 110 (step S14).

In the CPU 120 which has received the error information from the CPU 110, the error notification circuit 121 notifies the operating system 202 carried out by the CPU 120 of the error information on the CPU 110 (step S15). This is a process executed by the normal CPU 120 for setting the error information, such as the error type, the CPU number of the CPU in which the error has occurred, and the address, to a register, and then generating a trap to notify the operating system 202 of occurrence of the error.

In response to the notification of the generation of the trap, the operating system 202 performs trapping (step S16). In the trapping, a trapping section 212 of the operating system 202 refers to the register to thereby obtain the error information on the CPU 110 (the error type, the CPU number, and the address).

After that, the operating system 202 performs panic handling (step S17). In the panic handling, the processing functions of the panic handling section 232 perform the following processes: The error information display/record section displays and records the error information on the CPU 110. The file system synchronization section performs synchronization of the file system. The memory dump section obtains a memory dump. The system restart section restarts the system after termination of the other processes of the panic handling. As a result, the server 100 is shut down and then restarted.

As described above, when an error has occurred in the CPU 110, the other CPU 12 carries out the error handling, and hence it is possible to positively obtain the error information and the memory dump to restart the system. It should be noted that there can be a case where the CPU 120 requested to perform the error handling cannot carry out the error handling for some reason. In this case, the CPU 110 itself continues the error handling.

Figure 7:
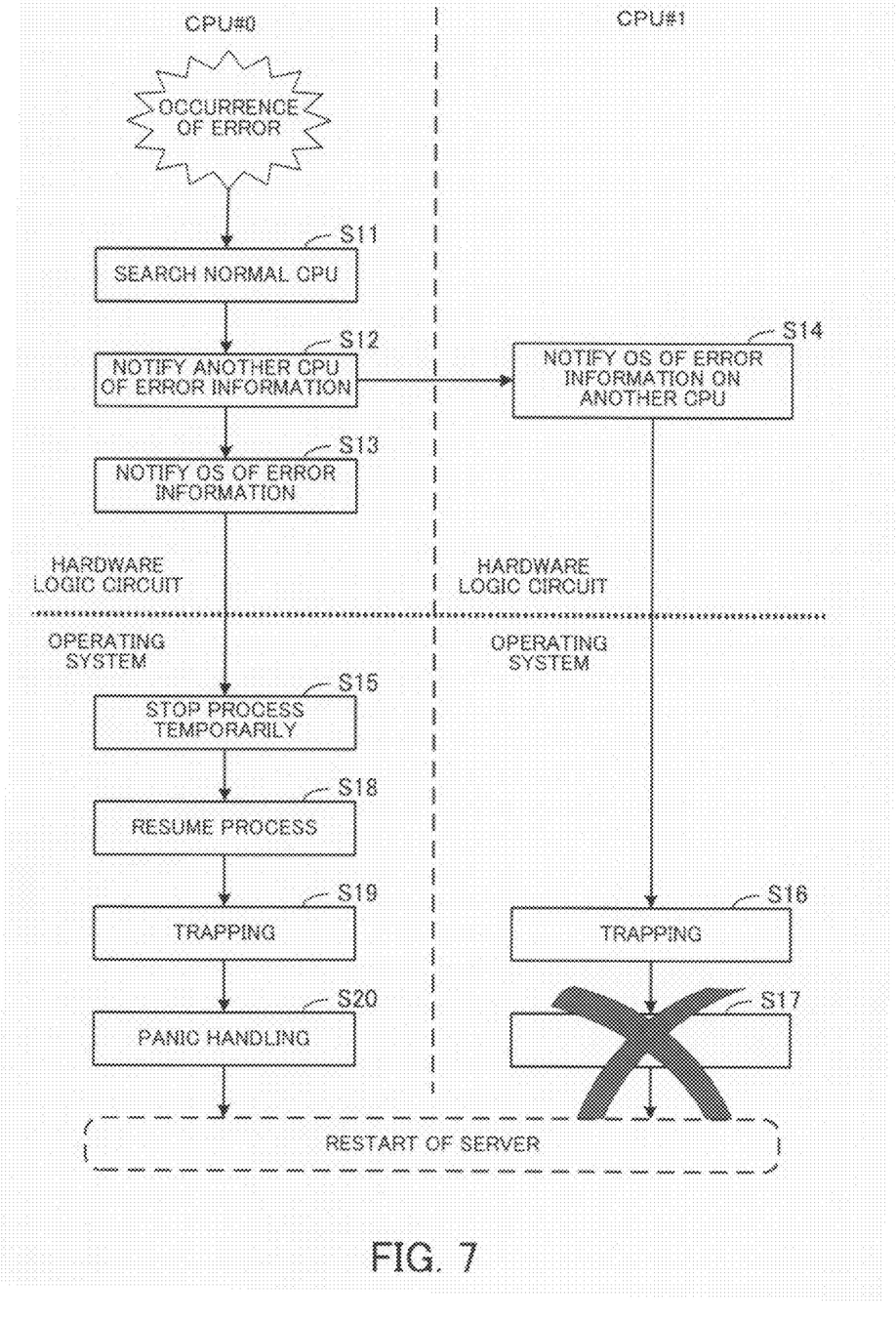
FIG. 7 is a sequence diagram showing a case in which error handling by another CPU has failed.

FIG. 7 is a sequence diagram showing a case in which error handling by another CPU has failed. This example shows a case in which the panic handling (step S17) by the CPU 120 has failed. The process carried out from the step S11 to the step S17 is the same as in the FIG. 6 process, and detailed description thereof is omitted.

When the panic handling by the CPU 120 has failed, the restart of the system is not performed. Therefore, the trapping section 211 of the operating system 201 carried out by the CPU 110 resumes the process by the CPU 110 (step S18) after the lapse of a predetermined time period from the temporary stoppage of the process (step S15).

Then, the trapping section 211 of the operating system 201 performed by the CPU 110 carries out the trapping (step S19). Further, the panic handling section 231 performs the panic handling (step S20). As a result, the server 100 is restarted.

As described above, although in the multi-CPU computer system of the prior art, a CPU in which an error has occurred performs post processing, such as recording of error information, according to the present embodiment, a normal CPU other than the faulty CPU performs the post processing for the CPU. By employing this method, it is possible to enhance reliability of the system.

More specifically, in the case of the multi-bit error continuously occurring in the CPU cache, for example, it is possible to avoid the problem of occurrence of the same error during trapping and panic handling, causing hang-up of the system or failure of the restart of the same. This also makes it possible to prevent the operation of the system from being stopped for a long time.

Moreover, the faulty CPU can be replaced as early, whereby it is possible to avoid the problem that the system is repeatedly adversely affected by the error in the same CPU. As a result, it is possible to prevent destruction of files and data caused by the incapability of performing the synchronization of the file system.

Further, a memory dump can be obtained positively, and hence it is possible to avoid a state of being incapable of specifying the primary factor of an error in which no memory dump can be obtained.

Further, by temporarily stopping a process by a CPU in which an error has occurred, it is possible to eliminate adverse influence of the error on a process by a normal CPU, which makes it possible to carry out the trapping and the panic handling positively and safely.

Furthermore, even if trapping and panic handling by a CPU in which no error is detected should be hung up, it is possible to execute the error handling by causing the faulty CPU to resume the process to execute the trapping and the panic handling.

More specifically, although error handling, such as trapping and panic handling, is executed by a CPU in which no error is detected, actually, there is a case in which a fault of a CPU in which no error is detected brings about an error in another CPU. In such a case, there is a possibility that an error is detected in a normal CPU, and the trapping and the panic handling is executed by a faulty CPU, causing hang-up of the system.

To eliminate this inconvenience, according to the present embodiment, a CPU in which an error is detected also executes the trapping and panic handling after a predetermined time period, for the worst case. This makes it possible to positively carry out the display and recording of error information, the synchronization of the file system, the obtaining of a memory dump, and the restart of the system.

It should be noted that the processing functions described above can be realized by a computer. To this end, there is provided a program describing the details of processing of the functions which are realized on the server based on the operating system. By executing the program on the computer, the processing functions described above are realized on the computer. The program describing the details of processing can be recorded in a computer-readable recording medium. The computer-readable recording medium includes a magnetic recording device, an optical disk, a magneto-optical recording medium, and a semiconductor memory. The magnetic recording device includes a hard disk drive (HDD), a flexible disk (FD), and a magnetic tape. The optical disk includes a DVD (Digital Versatile Disk), a DVD-RAM (Random Access Memory), and a CD-ROM (Compact Disk Read Only Memory), and a CD-R (Recordable)/RW (ReWritable). Further, the magneto-optical recording medium includes an MO (Magneto-Optical disk).

To make the program available on the market, portable recording media, such as DVD and CD-ROM, which store the program, are sold. Further, the program can be stored in a storage device of a server computer connected to a network, and transferred from the server computer to another computer via the network.

When the program is executed by a computer, the program stored e.g. in a portable recording medium or transferred from the server computer is stored into a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

In the present invention, another computer, which has received error information from a CPU in which a hardware error has occurred, carries out processing for storing fault information and restarting the system. This makes it possible to positively execute processing from the storing of the fault information to the restart of the system, even when a fatal error has occurred in one of the CPUs.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multi-CPU computer system having a plurality of CPUs installed therein for operating on a common operating system, comprising:

a nonvolatile storage device;

a first CPU that incorporates a first error notification circuit for notifying another CPU of error information when a hardware error has occurred in said first CPU; and a second CPU that incorporates a second error notification circuit for obtaining the error information from said first CPU and notifying the operating system of the error information, said second CPU executing a process for storing fault information including the error information in said storage device, and a process for restarting the multi-CPU computer system, according to the operating system, when the operating system is notified of the error information from said second error notification circuit;

wherein the first CPU further comprises a third error notification circuit to notify the operating system of the error information, and wherein the first CPU temporarily stops processing according to the operating system upon notification of the error information by said third error notification circuit and, when the multi-CPU computer system is not restarted during the temporary stoppage of the processing, stores data including the error information in said nonvolatile storage device, and restarts the multi-CPU computer system according to the operating system after a lapse of a predetermined time period from the stoppage of the processing.

2. The multi-CPU computer system according to claim 1, further comprising a common memory having an inter-CPU communication area, wherein:

said first error notification circuit of said first CPU stores the error information in said inter-CPU communication area of said common memory; and said second error notification circuit of said second CPU obtains the error information from said inter-CPU communication area.

3. A multi-CPU computer system comprising:

a nonvolatile storage device; and a plurality of CPUs operating on a common operating system, each CPU comprising:

a first error notification circuit to notify another CPU of error information indicating a hardware error that has occurred locally, and a second error notification circuit to notify the operating system of error information received from another CPU, and a third error notification circuit to notify the operating system of the error information indicating the hardware error that has occurred locally;

wherein each CPU with the operating system is configured to execute:

storing, upon receipt of the error information by said second error notification circuit, fault information including the received error information said nonvolatile storage device and restarting the multi-CPU computer system according to the operating system, stopping processing temporarily according to the operating system upon notification of the error information by said third error notification circuit, and storing, when the multi-CPU computer system is not restarted during the temporary stoppage of the processing, data including the error information in said nonvolatile storage device, and restarting the multi-CPU computer system according to the operating system after a lapse of a predetermined time period from the stoppage of the processing.

4. A system-restarting method for a multi-CPU computer system that has a plurality of CPUs installed therein for operating on a common operating system, the method comprising:

sending, upon detection of a hardware error in a first CPU, error information indicating the detected hardware error from the first CPU to a second CPU;

sending the error information from the second CPU to the operating system;

storing, by the second CPU, fault information including the error information in a nonvolatile storage device, and restarting the multi-CPU computer system according to the operating system;

sending the error information from the first CPU to the operating system;

stopping processing in the first CPU temporarily according to the operating system; and storing, by the first CPU when the multi-CPU computer system is not restarted during the temporary stoppage of the processing, data including the error information in said nonvolatile storage device, and restarting the multi-CPU computer system according to the operating system after a lapse of a predetermined time period from the stoppage of the processing.

* * * * *